June 13, 1967

J. BOCHAN 3,324,877

CHECK VALVE

Filed Dec. 30, 1963

INVENTOR.
JOHN BOCHAN
BY
HIS ATTORNEY

# United States Patent Office 3,324,877
Patented June 13, 1967

3,324,877
CHECK VALVE
John Bochan, Louisville, Ky., assignor to General
Electric Company, a corporation of New York
Filed Dec. 30, 1963, Ser. No. 334,151
3 Claims. (Cl. 137—512.15)

This invention relates to automatic check valves, and more particularly to such valves wherein a member formed of flexible elastomeric material deforms so as to permit fluid flow in a first desired direction and prevent fluid flow in the reverse direction.

Valves of hte general type mentioned above are well known and extensively used. However, in most such valves there is substantial stress placed on the material of the valve when it deforms between its open and closed positions, and this stress results in relatively rapid failure of the material. This is quite objectionable when the valve is incorporated in apparatus where it is not readily accessible and where the apparatus is expected to function without fault for a substantial period of time.

A substantial improvement in such valves, in that virtually none of the material of the valve is stressed, is provided by the check valve illustrated and claimed in my application Ser. No. 104,433, now Patent No. 3,118,468 assigned to General Electric Company, assignee of the present invention. In that case, however, as in most other check valves, a relatively sharp cut is provided in the material as a result of the fact that the opening is a slit which closes completely when the valve is to prevent flow. Even in this improved valve, higher stresses than would normally be desired develop at the very ends of the slit and tend to cause tearing unless substantial care is taken in the manufacture of the valve.

It is, therefore, an object of the present invention to provide an improved check valve wherein the opening and closing of the valve is effected essentially by deformation of the material rather than by stretching, and wherein there are no sharp corners or slit ends in the valve where relatively high stresses may induce tearing.

In carrying out my invention, in one aspect thereof I provide a check valve which includes a column secured to extend axially within a conduit. The column is formed with a smoothly curved cross-sectional contour, of which a substantial portion is concave. A valve member of flexible elastomeric material is secured at its upstream end in the conduit, with an axially extending tubular portion terminating substantially at its downstream end. This tubular portion is formed and positioned so as to be, in its normal position, in female mating relation to the column portion. When there is upstream pressure, the concave portion of the valve member deforms to a convex configuration and thereby allows flow. When there is downstream pressure, the tubular portion is tightly pressed about the column so as to prevent flow.

In the drawing, FIGURE 1 is a side elevational view, partly in cross section, of my invention wherein my valve is incorporated in a conduit in cooperative relation therewith;

Figure 1:
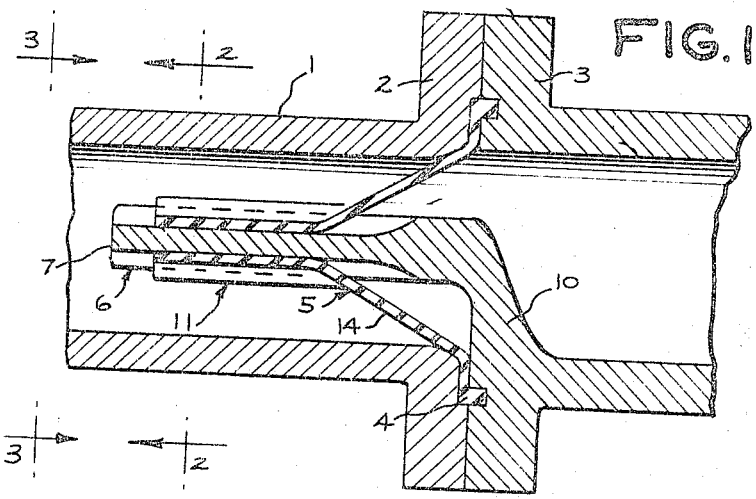

Refering now to the drawing, and more particularly initially to FIGURE 1, there is shown a conduit 1 which includes two separate conduit sections 2 and 3 conventionally formed with substantially similar internal diameters. Conduit sections 2 and 3 may be firmly secured together by any suitable means (not shown) to form the single continuous conduit 1. Secured within the junction of the two conduit sections 2 and 3 is the flange 4 of a valve member generally indicated at 5. Valve member 5 is formed of any suitable elastomeric material, such as rubber for instance. It can readily be seen that not only does this arrangement provide for the securement of the member 5 in position within conduit 1, but it also helps to seal the junction of conduit portions 2 and 3 so as to prevent any leakage at that junction.

A column member, generally indicated by the numeral 6, is secured within conduit 1 with a portion 7 extending essentially axially of the conduit. The shape of the column member can best be understood by reference to the remainder of the figures together with FIGURE 1. Main portion 7 of the column member includes a pair of opposed concave surfaces 8 extending for a substantial length axially within the conduit. Surfaces 8 are joined by axially extending convex surfaces 9. The relationship of surfaces 8 to surfaces 9 is such that a contour of the cross section of column portion 7 includes a substantially greater length for sections 8 than sections 9. Sections 8 and 9 are joined by smooth curves so that there is no abrupt change of direction of a surface anywhere on the column portion 7.

At its upstream end, column 6 is secured to conduit part 3 by a joining section 10. Preferably, as shown, a single joining section of substantial width is provided so that, when the valve is used to control the flow of a liquid which has impurities such as lint and hair therein, there will be very little tendency for such filamentary matter to build up around the section 10. In other words, section 10 is a relatively wide joining member, preferably of smoothly curved contour, joining main portion 7 of the column to conduit section 3.

Figure 2:
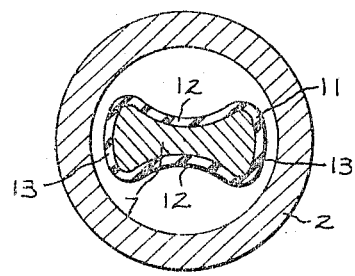
FIGURE 2 is a view along line 2—2 in FIGURE 1.
Figure 4:
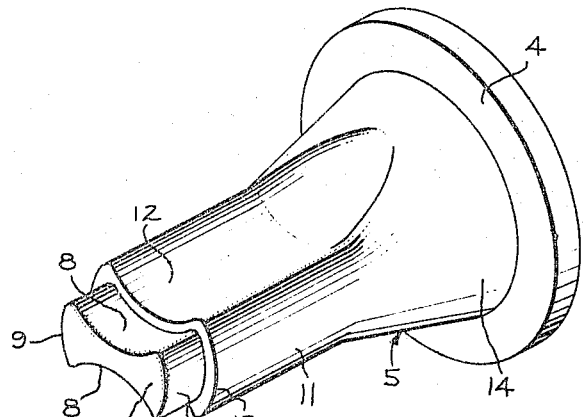
FIGURE 4 is a view in perspective of the main components of my improved check valve.
Figure 3:
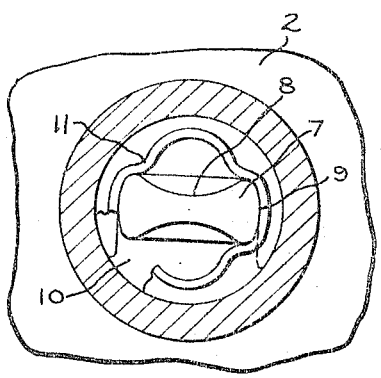
FIGURE 3 is a view along line 3—3 in FIGURE 1.

Valve member 5 is secured at its upstream end by flange 4. The valve member has an elongated tubular portion 11 thereof which is formed and positioned so as to be in female mating engagement with portion 7 of column 6. That is, it has a smooth cross sectional contour including concave sections 12 and convex sections 13, with sections 12 forming a substantially greater part of the contour than sections 13, and with the junction between the convex and concave portions being smoothly curved rather than abrupt. Portion 11 of member 5 is preferably joined to the securing flange 4 by a frusto-conical portion 14, which helps the initial opening of the valve in response to flow through conduit 1 from right to left (FIGURE 1).

Where there is no flow through conduit 1, or when there tends to be a backward flow, that is, from left to right as viewed in FIGURE 1, the pressure on the outside of the conduit portion 11 of member 5, as well as its natural shape, tends to press it into snug mating relation with column portion 7, and thereby close the valve securely. This is, in essence, the condition shown in FIGURE 2. When, however, there is pressure upstream of the valve, that is, there is to be flow through the conduit from right to left, the upstream pressure causes the concave portions 12 of the valve to deform to a convex configuration as shown in FIGURE 3. When this happens, there are two substantially clear passages on opposite sides of the column portion through which flow will result. It will readily be observed that this flow occurs virtually without stretching of the material, and with substantially straight-through passages. In addition, whether in its closed position or in its open position, portion 11 of member 5 does not include abrupt corners at which stresses will tend to create tearing. Rather, all parts of the member are smoothly curved so that there is no tendency to tear and the valve is assured of a long life. It will, of course, be apparent that while I prefer a pair of opposed concave surfaces, as shown, in the broad aspect of my invention a single such surface, or more than two may be provided.

While in accordance with the patent statutes I have described what at present is considered to be the preferred embodiment of my invention, it will be obvious to those skilled in the art that various changes and modifications may be made therein without departing from the invention, and it is therefore aimed in the appended claims to cover all such changes and modifications as fall within the true spirit and scope of my invention.

What I claim as new and desire to secure by Letters Patent of the United States is:

1. A check valve for use in a conduit comprising:
   (a) a column secured in said conduit to extend axially therewithin, said column having an axially extending portion thereof formed with a smoothly curved cross sectional contour, said contour including opposed concave sections joined by convex sections, said concave sections forming a substantially larger part of said contour than said convex sections;
   (b) and a valve member of elastomeric material secured at its upstream end in said conduit, said valve member having an axially extending tubular portion thereof terminating substantially at the downstream end of said column, said tubular portion being formed and positioned to be in female mating relation to said column portion;
   (c) said tubular portion deforming in response to pressure upstream thereof so that the concave portion thereof deforms to a convex configuration to allow flow, said tubular portion being tightly pressed about said column portion in response to downstream pressure to prevent flow.

2. The check valve defined in claim 1 wherein said valve member terminates slightly short of the downstream end of said column.

3. The check valve defined in claim 1 wherein said valve member includes at its upstream end an outwardly extending flange secured to said conduit and a frusto-conical portion connecting said flange to said tubular portion.

References Cited

UNITED STATES PATENTS

| | | | |
|---|---|---|---|
| 2,573,712 | 11/1951 | Kallam | 251—5 |
| 2,621,889 | 12/1952 | Annin | 137—525 |
| 2,926,692 | 3/1960 | Zillman | 137—512.15 |
| 3,039,733 | 6/1962 | Mattioli | 251—5 |

FOREIGN PATENTS 85,256   3/1955   Norway.

WILLIAM F. O'DEA, *Primary Examiner.*

HAROLD WEAKLEY, *Examiner.*